(12) United States Patent
O'Connell (10) Patent No.: US 6,849,358 B2
(45) Date of Patent: Feb. 1, 2005

(54) LITHIUM ION BATTERY

(75) Inventor: Ronald O'Connell, Harpersfield, OH (US)

(73) Assignee: NGK Spark Plug Co., Ltd. (JP)

( * ) Notice: Subject to any disclaimer, the term of this patent is extended or adjusted under 35 U.S.C. 154(b) by 73 days.

(21) Appl. No.: 09/827,985

(22) Filed: Apr. 6, 2001

(65) Prior Publication Data

US 2002/0146620 A1 Oct. 10, 2002

(51) Int. Cl.$^7$ .......................... H01M 2/26; H01M 10/04
(52) U.S. Cl. ...................................... 429/211; 429/161
(58) Field of Search ................................ 429/127, 128, 429/132, 152, 159, 161, 178–179, 211, 133

(56) References Cited

U.S. PATENT DOCUMENTS

| | | | |
|---|---|---|---|
| 6,056,185 A | 5/2000 | Daroux et al. | 228/110.1 |
| 6,145,280 A | 11/2000 | Daroux et al. | 53/433 |
| 6,207,271 B1 | 3/2001 | Daroux et al. | 428/344 |
| 6,267,790 B1 | 7/2001 | Daroux et al. | 29/623.2 |
| 2002/0081491 A1 * | 6/2002 | Gross et al. | 429/181 |

FOREIGN PATENT DOCUMENTS

| | | | | |
|---|---|---|---|---|
| EP | 1045466 A1 * | 10/2000 | | H01M/4/72 |
| JP | 2000-215877 | 8/2000 | | H01M/2/06 |
| JP | 2000-311665 | 11/2000 | | H01M/2/06 |
| JP | 2000311713 A * | 11/2000 | | H01M/10/40 |

OTHER PUBLICATIONS

JPO Website translation of JP 2000–215877 A.*
JPO Website translation of JP 2000–311665 A.*

* cited by examiner

Primary Examiner—Gregg Cantelmo
(74) Attorney, Agent, or Firm—Kusner & Jaffe (57) ABSTRACT

A multi-cell Li-ion or Li-ion polymer battery, comprised of a plurality of generally planar cell sections, each having at least one flat, metallic current collector tab extending therefrom. A plurality of the current collector tabs are aligned in spaced-apart relationship and extend from one side of the cell body. Each of the tabs has a free end and an intermediate portion. A tab weldment joins the free ends of the tabs but leaves the intermediate portions of the tabs unattached to each other. The tabs are welded together when the tabs are stacked together at a location offset from the cell body, such that the tabs are folded into a generally U-shaped configuration with the unattached intermediate portions forming a smooth layered, generally U-shaped structure when the tab weldment is disposed adjacent the one side of the cell body.

4 Claims, 9 Drawing Sheets

LITHIUM ION BATTERY

FIELD OF THE INVENTION

The present invention relates generally to Li-ion and/or Li-ion polymer batteries, and more particularly, to a method of joining current collectors in a multi-layer cell.

BACKGROUND OF THE INVENTION

Improvements in microelectronics have increased the demand for electrolyte battery cells, such as Li-ion and/or Li-ion polymer cells, that can be directly incorporated into electronic devices so as to produce a portable, self-contained product. Some of these products are designed such that the battery cell may be attached directly to an electronic circuit within the product.

Broadly stated, a Li-ion and/or Li-ion polymer cell is generally comprised of a plurality of layered sections, namely, an anode section, a cathode section and a separator layer that is disposed between the anode section and cathode section. Multi-layered cells are comprised of a plurality of anode sections and cathode sections.

Each anode section and each cathode section includes a layer of a conductive material that is disposed within or in contact with such section. This layer forms what is conventionally referred to as a "current collector." It is conventionally known to use metal screens or meshes or foils to form the aforementioned current collectors. Typically, copper mesh is used to form an anode current collector, and an aluminum metal mesh is used to form a cathode current collector. Multi-layered cells typically include a plurality of anode current collectors and a plurality of cathode current collectors. Each current collector generally includes an outwardly extending, short tab that is ultimately to be connected to a battery lead. Battery leads are typically comprised of a flat metallic strip, formed of copper, aluminum or nickel. It is, therefore, necessary to join all anode current collectors together and attach them to a single anode lead. Likewise, all cathode current collector tabs must be joined together and attached to a cathode lead.

Typically, multi-layered cells are comprised of "bi-cells" that are stacked together. A bi-cell typically includes an anode section disposed between two cathode sections. Thus, such batteries have twice as many cathode current collectors as anode current collectors. For example, it is not unusual for multi-layered cells to have ten or more cathode current collector tabs that must be joined together and attached to a cathode lead. Such a battery would require that five or more current collector tabs be joined together and attached to an anode lead.

Since the anode current collector tabs and the cathode current collector tabs and their connections, respectively, to an anode lead and a cathode lead, necessarily occur within a battery package, the area within the battery allotted to this assembly reduces space for active battery material. Accordingly, it is highly desirable to minimize the space utilized in joining current collector tabs and leads within a battery package.

The present invention provides a method of joining current collector tabs and battery leads and a structure formed thereby.

SUMMARY OF THE INVENTION

In accordance with the present invention, there is provided a method of joining current collector tabs from a multi-cell Li-ion or Li-ion polymer battery, comprising the steps of:

a) stacking a plurality of cell sections, the cell sections being essentially identical and each being essentially flat and having a flat metallic current collector tab extending therefrom, wherein the cell sections, when stacked, form a cell body having outwardly facing planar surfaces, with the tabs extending from an end of the cell body in aligned, spaced-apart, parallel relationship;

b) gathering the tabs into a stack at a location offset from the cell body;

c) compressing and welding ends of the tabs together at the location to form a tab weldment; and d) folding the tabs about an axis disposed between and parallel to the planar surfaces to position the tab weldment adjacent to the end of the cell body, with the tabs and the tab weldment disposed within the space defined by the planar surfaces.

In accordance with another aspect of the present invention, there is provided a multi-cell Li-ion or Li-ion polymer battery, comprised of a plurality of generally planar cell sections. Each cell section has at least one flat, metallic current collector tab extending therefrom. The cell sections are stacked one on another to form a cell body having a planar upper surface and a planar lower surface. A plurality of the current collector tabs are aligned in spaced-apart relationship between the upper planar surface and the lower planar surface, and extend from one side of the cell body. Each of the tabs has a free end and an intermediate portion. A tab weldment joins the free ends of the tabs, but leaves the intermediate portions of the tabs unattached to each other. The tabs are welded together when the tabs are stacked together at a location offset from the cell body, such that the tabs are folded into a generally U-shaped configuration with the unattached intermediate portions forming a smooth layered, generally U-shaped structure when the tab weldment is disposed adjacent the one side of the cell body.

In accordance with another aspect of the present invention, there is provided a multi-cell Li-ion or Li-ion polymer battery, comprised of a plurality of generally planar cathode sections, each having at least one flat, metallic cathode current collector tab extending therefrom and a plurality of generally planar anode sections each having at least one flat, metallic anode current collector tab extending therefrom. The cathode and anode sections are stacked together to form a cell body. A plurality of the cathode current collector tabs are aligned and extend from one side of the cell body. Each of the cathode current collector tabs has a free end and an intermediate portion. A plurality of the anode current collector tabs are aligned and extend from one side of the cell body. Each of the anode current collector tabs has a free end and an intermediate portion. A cathode tab weldment joins the free ends of the cathode current collector tabs, but leaves the intermediate portions of the cathode current collector tabs unattached to each other. The cathode current collector tabs are welded together when the cathode current collector tabs are stacked together at a location offset from the cell body, such that the cathode current collector tabs are folded into a generally U-shaped configuration with the unattached intermediate portions forming a smooth layered, generally U-shaped structure with the cathode tab weldment disposed adjacent the one side of the cell body. An anode tab weldment joins the free ends of the anode current collector tabs but leaves the intermediate portions of the anode current collector tabs unattached to each other. The anode current collector tabs are welded together when the anode current collector tabs are stacked together at a location offset from the cell body, such that the anode current collector tabs are folded into a generally U-shaped configuration with the unattached intermediate portions forming a smooth layered, generally U-shaped structure with the anode tab weldment disposed adjacent the one side of the cell body.

It is an object of the present invention to provide a method of electrically joining current collector tabs in a Li-ion and/or Li-ion polymer battery.

Another object of the present invention is to provide a method as described above that reduces lost "head-space" within a battery package.

Another object of the present invention is to provide a method of electrically joining current collector tabs as described above that increases the allowable space within a package for active battery material.

Another object of the present invention is to provide a method of electrically joining current collector tabs as described above, wherein the stress exerted on layers of the battery are minimized.

Another object of the present invention is to provide a method of electrically joining current collector tabs as described above, wherein a solid metal lead is connected to the current collector tabs as they are being electrically joined.

A still further object of the present invention is to provide a method as described above, wherein the solid metal tab is oriented in such a fashion that it forms a barrier between the joined current collector tabs and the interior of the battery package.

These and other objects will become apparent from the following description of a preferred embodiment of the invention, taken together with the accompanying drawings.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

The present invention relates to a method of joining current collector tabs in a multi-cell battery, and to an assembly formed thereby. Another aspect of the present invention relates to attaching leads to current collector tabs. The present invention is particularly applicable to joining current collector tabs and leads of batteries formed of Li-ion polymer cells and will be described with particular reference thereto. It will, of course, be appreciated from a further reading of the specification that the invention finds advantageous with a Li-ion cell.

Figure 1:
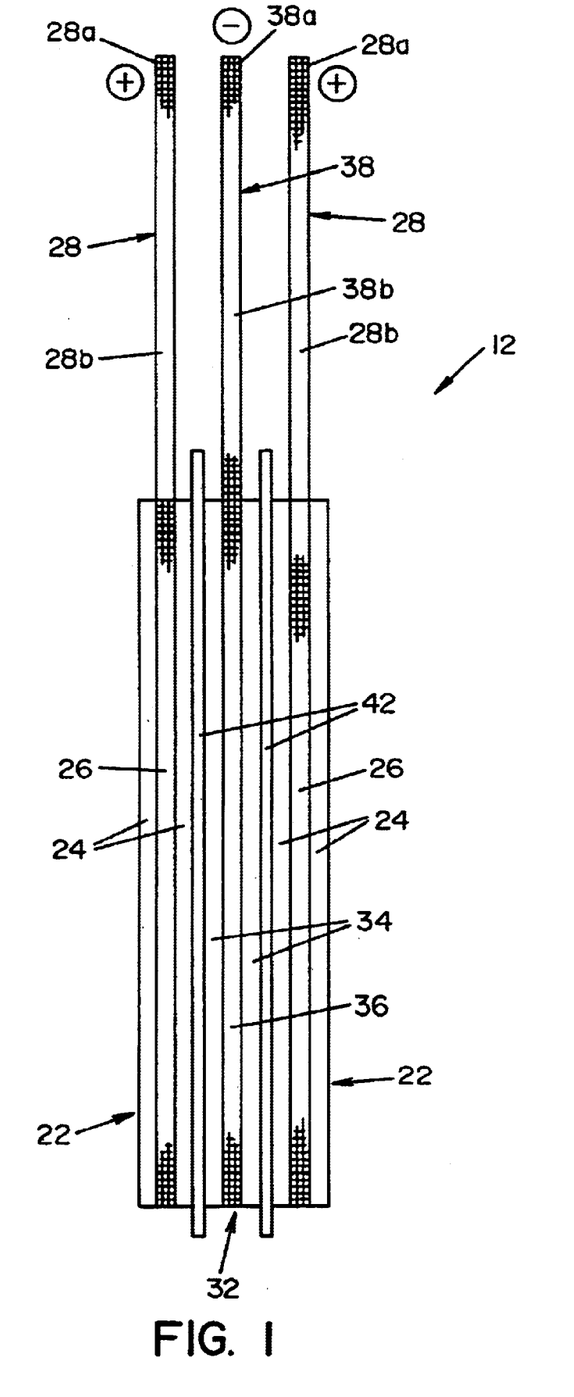
FIG. 1 is a side elevational view of a "bi-cell" section used to form an embodiment of the present invention.

Referring now to the drawings wherein the showings are for the purpose of illustrating a preferred embodiment of the invention only, and not for the purpose of limiting same, FIG. 1 shows a bi-cell 12. Bi-cell 12 is preferably a lithium-based electrochemical cell. Bi-cell 12 may be a primary (non-rechargeable) cell or a secondary (rechargeable) cell. Bi-cell 12 is comprised of two cathode sections 22 and an anode section 32 disposed therebetween. A separator layer 42 is disposed between anode section 32 and each cathode section 22.

Each cathode section 22 is comprised of two layers 24 of a cathode film. Cathode film layer 24 is preferably comprised of a lithiated metal oxide active material, a conductive material and a binder material. A current collector 26 formed of a metal screen, metal mesh or a sheet of perforated metal is provided between cathode layers 24. Current collector 26 is preferably formed of an aluminum or copper mesh. Current collector 26 preferably has a thickness of about 25 $\mu$m to about 50 $\mu$m. Current collector 26 includes an outward extending tab or strip 28. Each cathode current collector tab 28 has a free end 28a and an intermediate portion 28b that is defined between free end 28a and the juncture where tab 28 extends from current collector 26. Each cathode layer 24 preferably has a thickness of about 50 $\mu$m to about 200 $\mu$m, and more preferably about 80 $\mu$m to about 150 $\mu$m.

Anode section 32 is comprised of two layers 34 of an anode film having a current collector 36 disposed therebetween. Current collector 36 is preferably formed of a metal mesh, metal screen or a sheet of perforated metal having a thickness of about 25 $\mu$m to about 50 $\mu$m. Current collector 36 is preferably formed of an aluminum or copper mesh. The film-forming anode layers 34 are preferably comprised of a carbon active material, a conductive material and a binder material. Current collector 36 includes an outwardly extending tab or strip 38. Each anode current collector tab 38 has a free end 38a and an intermediate portion 38b that is defined between free end 38a and the juncture where tab 38 extends from current collector 36. Each anode layer 34 preferably has a thickness of about 50 $\mu$m to about 200 $\mu$m, and more preferably about 80 $\mu$m to about 150 $\mu$m.

Figure 2:
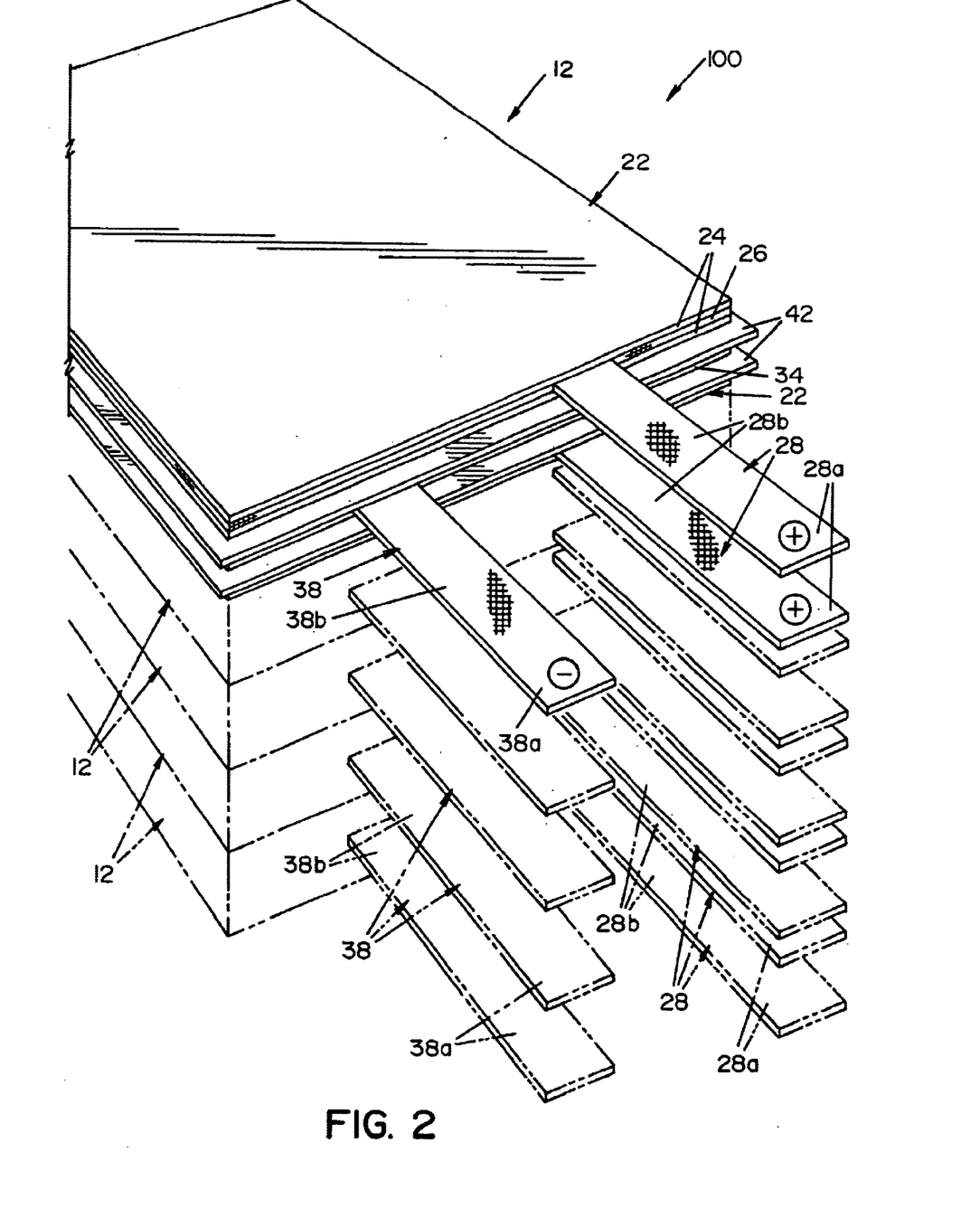
FIG. 2 is a perspective view of a multi-layer cell having a plurality of anode current collector tabs and cathode current collector tabs extending therefrom.

FIG. 2 shows a multi-layer cell 100 comprised of a plurality of cell sections, each having a current collector tab extending therefrom. As used herein, the term "cell section" shall refer to any section of multi-layer cell 10 having one or more current collector tabs extending therefrom. In this respect, "cell section" may refer to a bi-cell section 12 or a cathode section 22 or an anode section 32. In the embodiment shown in FIG. 2, multi-layer cell 100 is comprised of five (5) bi-cells 12, i.e., ten (10) cathode sections 22 and five (5) anode sections 32, stacked one on top of another such that cathode current collector tabs 28 and anode current collector tabs 38 are justified and aligned.

Figure 3:
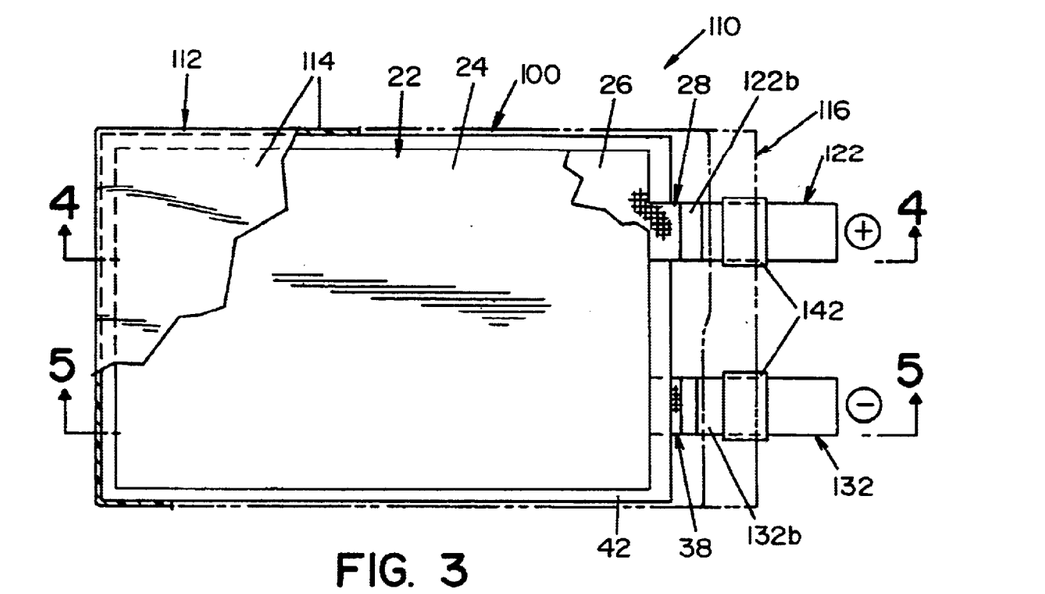
FIG. 3 is a top plan view of a packaged multi-layered cell having anode and cathode current collector tabs joined together and attached respectively to anode and cathode leads in accordance with the present invention.

Referring now to FIG. 3, a battery 110 comprised of cell 100 contained within a flexible package 112 formed of a laminate 114 is shown. Package 112 is shown partially in phantom and partially sectioned in FIG. 3. In the embodiment shown, package 112 is comprised of a flexible laminate 114 of the type disclosed in U.S. Pat. 6,207,271 B1 and U.S.

Pat. No. 6,145,280, both to Daroux et al. The disclosures of U.S. Pat. Nos. 6,207,271 B1 and 6,145,280 are both expressly incorporated herein by reference.

Figure 4:
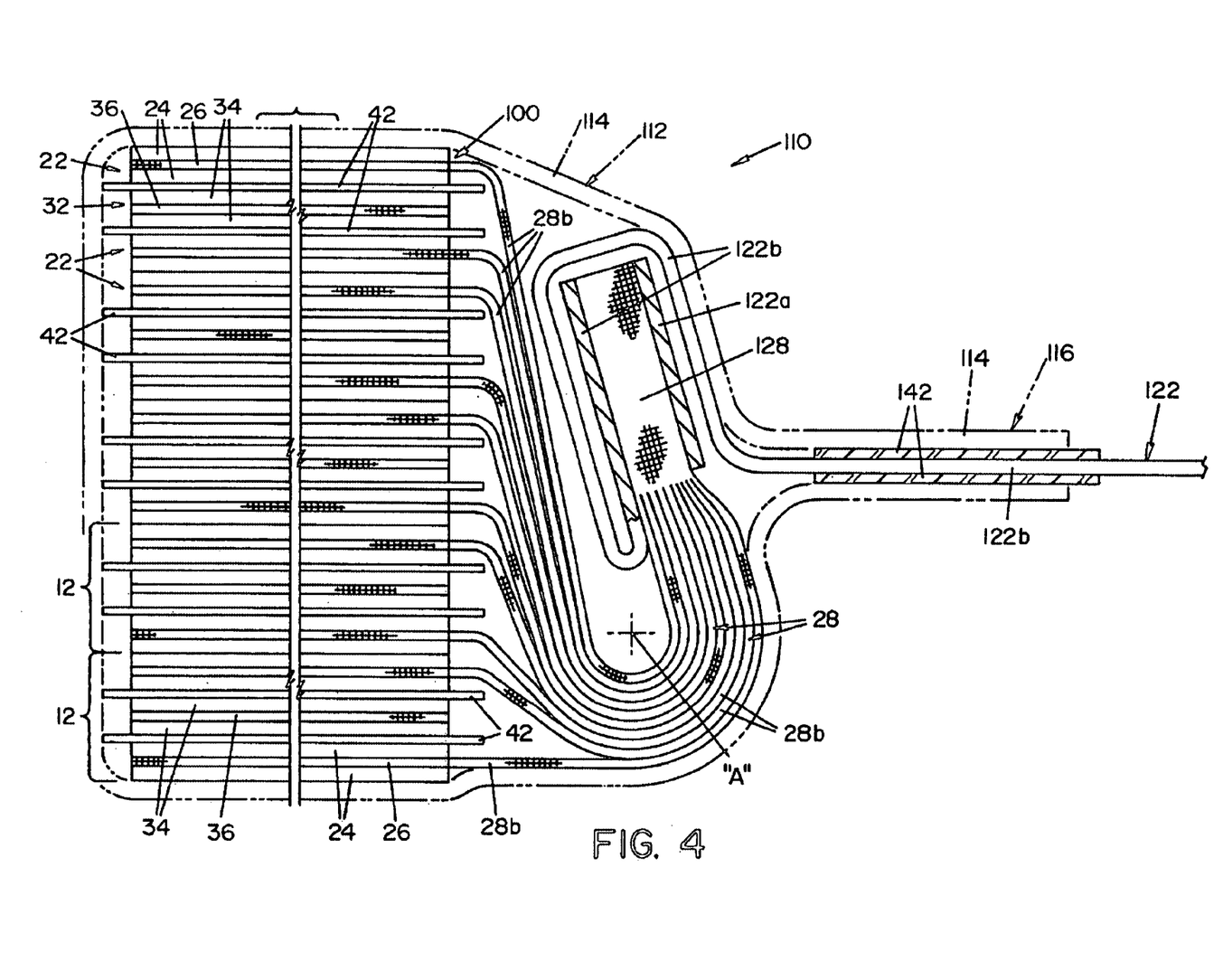
FIG. 4 is an enlarged sectional view taken along lines 4—4 of FIG. 3, showing anode current collector tabs electrically joined together and attached to an anode lead in accordance with the present invention.

In battery 110, free ends 28a of cathode current collector tabs 28 are joined together into a generally solid cathode tab weldment 128, best seen in FIG. 4. Intermediate portions 28b of cathode current collector tabs 28 remain unattached, but assembled into a smooth layered, generally U-shaped structure. In the embodiment shown in FIGS. 4 and 5, multi-layer cell 100 is comprised of five (5) bi-cells 12 having ten (10) cathode current collector tabs 28 and five (5) anode current collector tabs 38.

A metal, cathode lead 122 is attached to cathode tab weldment 128. Cathode lead 122 is typically formed of a thin strip of aluminum foil, having a width approximately equal to the width of cathode current collector tabs 28. Lead 122 is comprised of a first cathode lead portion 122a attached to a first side of cathode tab weldment 128 and a longer, second cathode lead portion 122b attached to a second side of cathode tab weldment 128. As illustrated in FIG. 4, cathode current collector tabs 28 are collected together into a smooth, layered assembly wherein ends 28a of cathode current collector tabs 28 are joined together into cathode tab weldment 128. Cathode tab weldment 128 and portions of current collector tabs 28 are wrapped about an axis, designated "A" in the drawings, to a position wherein cathode tab weldment 128 is disposed adjacent to the end of cell 110. The major axis of tab weldment 128 being almost perpendicular to the horizontal plane defined by the respective layers forming bi-cells 12, as best seen in FIG. 4. Cathode lead portion 122b is replicated, i.e., folded over itself, and wrapped around cathode tab weldment 128. Cathode lead portion 122b defines the cathodic lead of battery 110.

Cathode lead portion 122b extends through seam 116, formed in package 112 where the packaging laminate is sealed around cathode lead portion 122b. An adhesive/sealing band 142 is formed around cathode lead portion 122b to facilitate sealing and bonding of the packaging laminate to cathode lead portion 122b. The composition of sealing band 142, and a method of sealing the packaging laminate around cathode lead portion 122b is taught in U.S. Pat. No. 6,267,790 to Daroux et al., the disclosure of which is expressly incorporated herein by reference.

Figure 5:
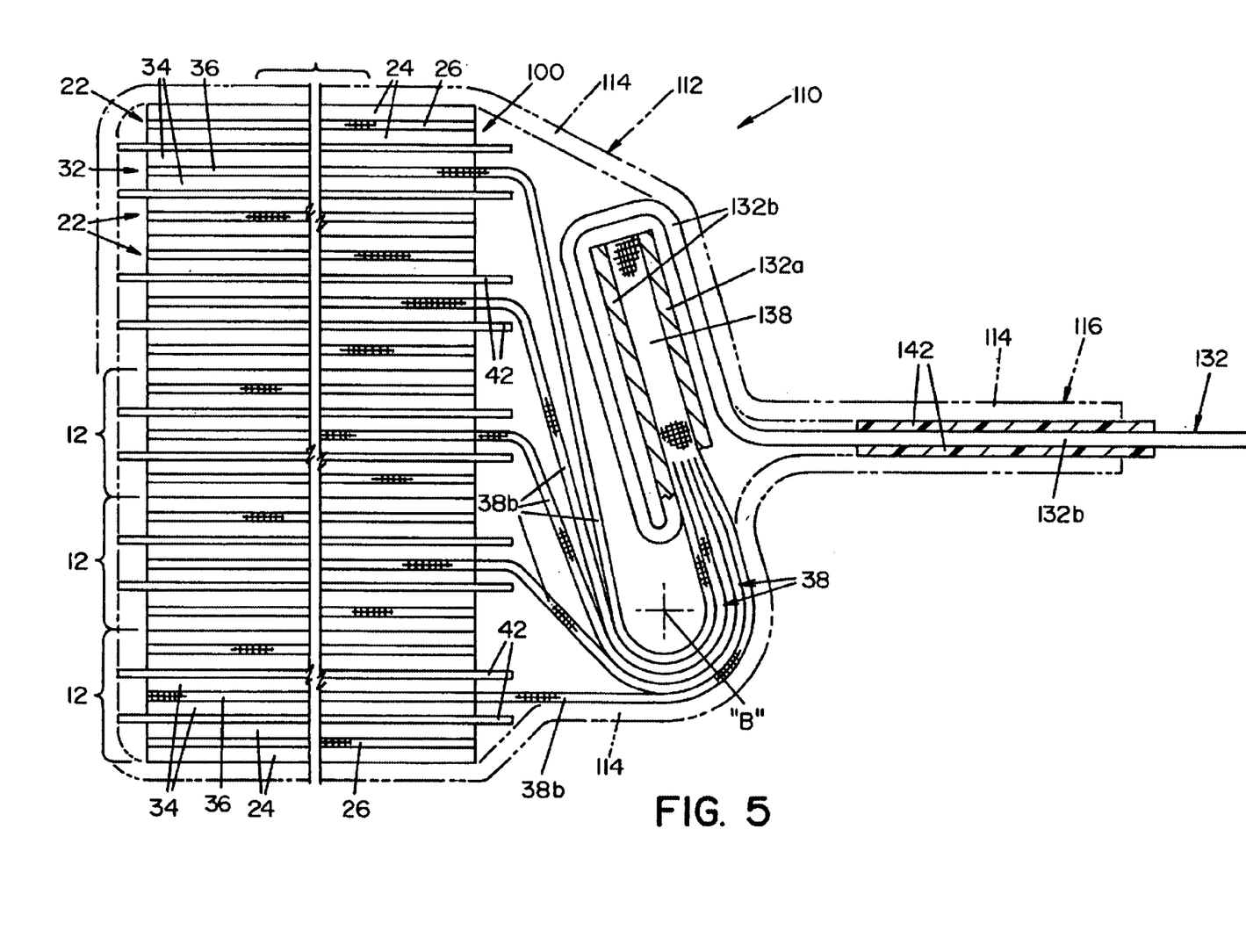
FIG. 5 is an enlarged sectional view taken along lines 5—5 of FIG. 3, showing cathode current collector tabs electrically joined together and attached to a cathode lead, in accordance with the present invention.

In a similar fashion, anode current collector tabs 38 are joined together into a generally solid anode tab weldment 138, best seen in FIG. 5. Intermediate portions 38b of anode current collector tabs 38 remain unattached, but assembled into a smooth layered, generally U-shaped structure.

A metal, anode lead 132 is attached to anode tab weldment 138. Lead 132 is comprised of a first anode lead portion 132a that is attached to a first side of anode tab weldment 138. A longer, second anode lead portion 132b is attached to a second side of anode tab weldment 138. Anode lead portions 132a and 132b are typically formed from a thin strip of copper or nickel foil, having a width approximately equal to the width of anode current collector tabs 38. As illustrated in FIG. 5, anode current collector tabs 38 are collected together into a smooth, layered assembly wherein ends 38a of anode current collector tabs 38 are joined together and form anode tab weldment 138. Anode tab weldment 138 is wrapped about an axis, designated "B" in the drawings, to a position wherein anode tab weldment 138 is disposed adjacent to the end of cell 110. The major axis of tab weldment 138 being almost perpendicular to the horizontal plane defined by the respective layers of bi-cells 12, as best seen in FIG. 5. Anode lead portion 132b is replicated, i.e., folded over itself, and wrapped around anode tab weldment 138. Anode lead portion 132b defines the anodic lead of battery 110.

Like cathode lead portion 122b, anode lead portion 132b extends through seam 116 in package 112. An adhesive/sealing band 142 is formed around anode lead portion 132b to facilitate sealing and bonding of the packaging laminate to anode lead portion 132b. As best seen in FIG. 3, anode tab assembly is offset from cathode tab assembly to prevent contact therebetween.

Referring now to FIGS. 6A–6F, steps for joining current collector tabs together and attaching a battery lead to the joined current collector tabs are shown, together with a method of packaging a multi-layer cell. The steps of joining cathode current collector tabs 28 together and attaching cathode lead 122 thereto are essentially the same as the steps of joining anode current collector tabs 38 together and attaching anode lead 132 thereto. Accordingly, the steps of joining cathode current collector tabs 28 together and attaching cathode lead 122 thereto shall be described in detail, such description applying equally for the step of joining anode current collector tabs 38 together and attaching anode lead 132 thereto.

Figure 6A:
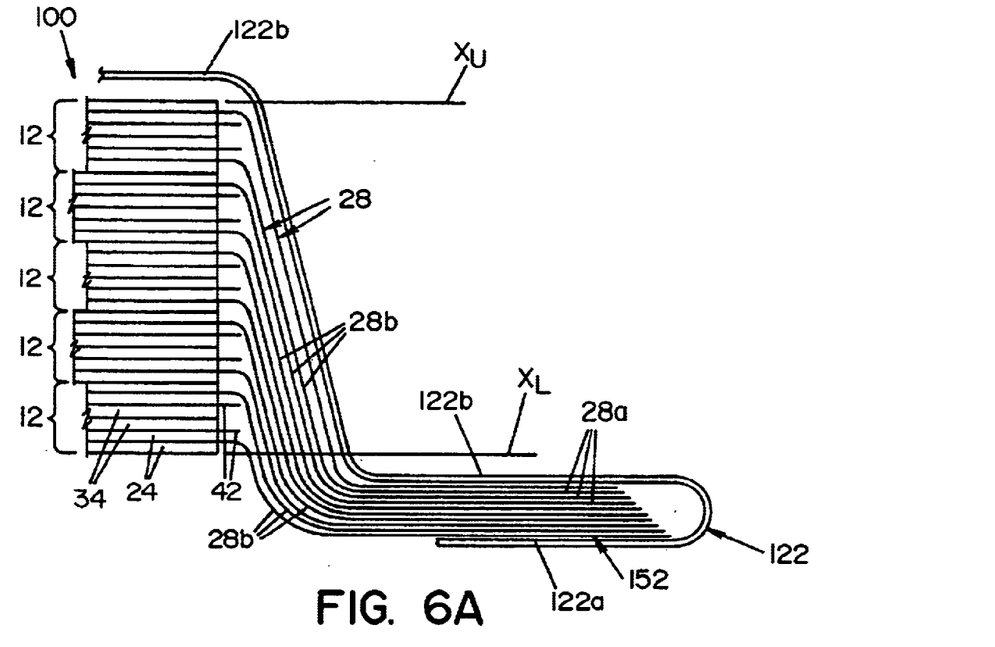
FIGS. 6A–6F are enlarged views schematically illustrating the steps of electrically joining cathode current collector tabs and attachment of the joined current collector tabs to a cathode lead, and packaging of the joined cathode current collector tabs within a package.

FIG. 6A shows multi-layer cell 100 comprised of five (5) bi-cells 12. The outer surface of the lowermost bi-cell 12 defines a lower, planar surface, designated $X_L$. The outer surface of the uppermost bi-cell 12 defines an upper, planar surface, designated $X_U$. Cathode current collector tabs 28 from bi-cells 12 are collected into a stack, designated 152. Cathode lead 122 is wrapped around stack 152 of current collector tabs 28, wherein cathode lead portion 122a is disposed on one side of stack 152 and cathode lead portion 122b is disposed on the other side of stack 152. In the orientation shown, cathode lead portion 122a is on the bottom surface of stack 152 and cathode lead portion 122b is on the upper surface of stack 152. In accordance with the present invention, stack 152 of current collector tabs 28 is assembled outside an envelope or area defined by planes $X_L$ and $X_U$. In other words, stack 152 of cathode current collector tabs 28 is offset from multi-layer cell 100.

Figure 6B:
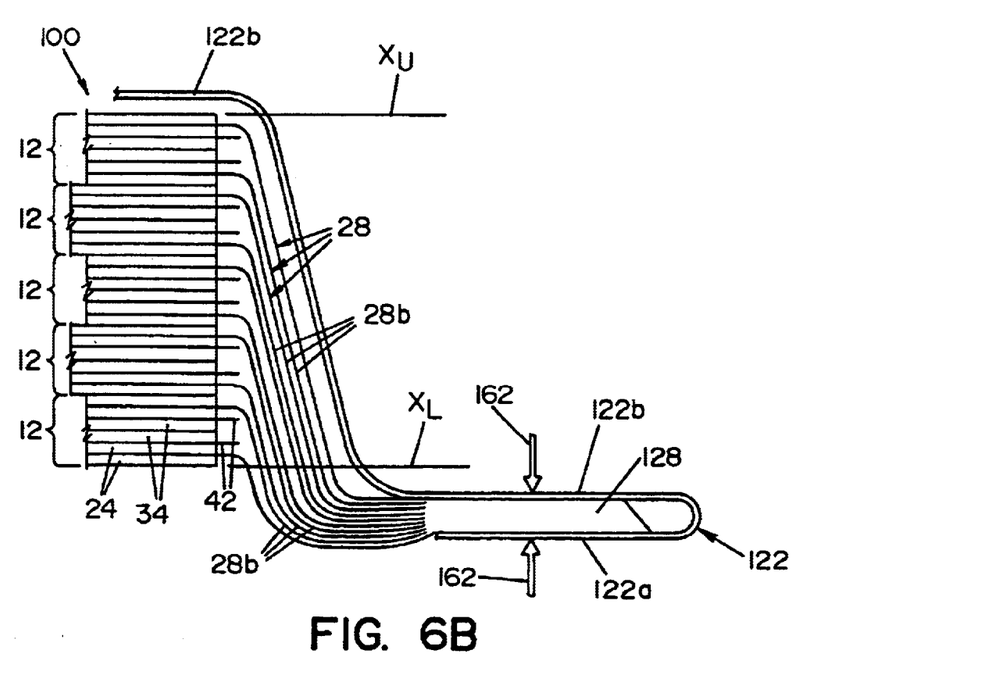

At a location offset from multi-layer cell 100, stack 152 is subjected to pressure and is welded to fuse the ends of cathode current collector tabs 28 and cathode lead 122 together to form a cathode tab weldment 128, as schematically illustrated in FIG. 6B, by arrows 162. One method of welding current collector tabs and copper strips together is by ultrasonic welding as disclosed in U.S. Pat. No. 6,056,185 to Daroux et al., the disclosure of which is expressly incorporated herein by reference. As will be appreciated, the settings of an ultrasonic welder, namely the energy, force, pressure, amplitude, time and power, to weld collector tabs and a battery lead together will depend upon the thickness, composition and number of collector tabs, as well as the thickness and composition of the battery lead. The ultrasonic welding joins the cathode current collector tabs 28 and cathode lead 122 into a cathode tab weldment 128, sometimes conventionally referred to as a "nugget." It has been found that vibrating the current collector tabs prior to welding facilitates better positioning and aligning of the current collector tabs for welding.

Figure 6C:
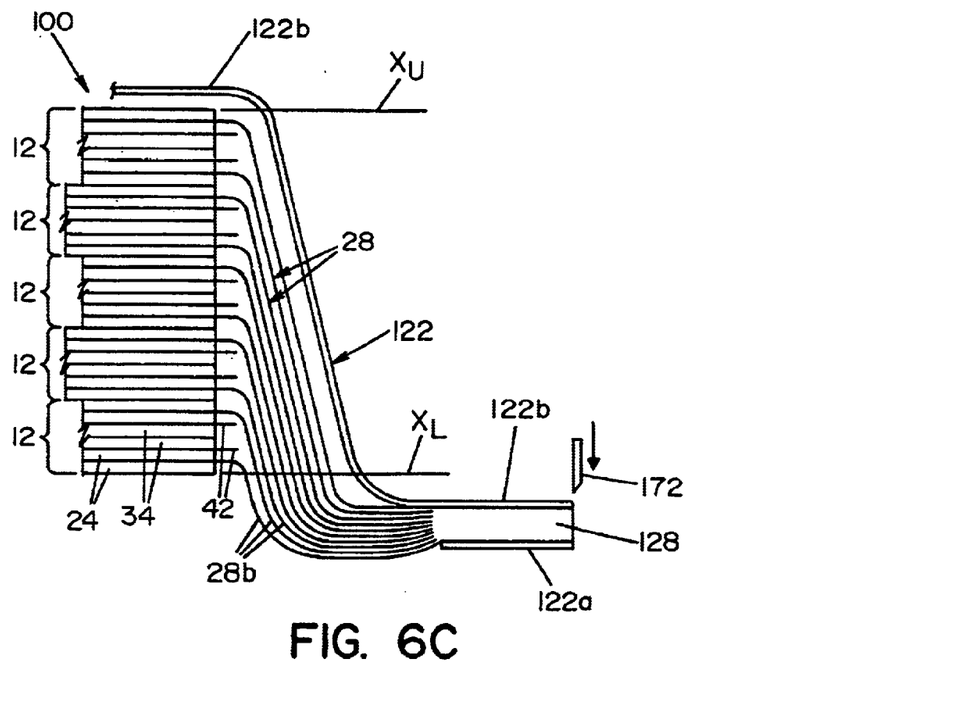

Because the cathode current collector tabs are assembled and welded together at a location offset from the body of cell 100, the ends of cathode current collector tabs 28 generally will not align. Because of the offset assembly and welding, cathode collector tabs 28 of uppermost bi-cells 12 span a greater length to reach the stacking and welding location, as compared to cathode current collector tabs 28 of lower bi-cells 12, as illustrated in FIGS. 6A and 6B. A trimming process preferably trims the end of cathode tab weldment 128. A shearing or stamping process, as schematically illustrated in FIG. 6C by a cutter 172, is preferably used to form a uniform, smooth end or edge to cathode tab weldment 128. A shearing or stamping process basically separates and isolates cathode lead portion 122a from cathode lead portion 122b.

Figure 6D:
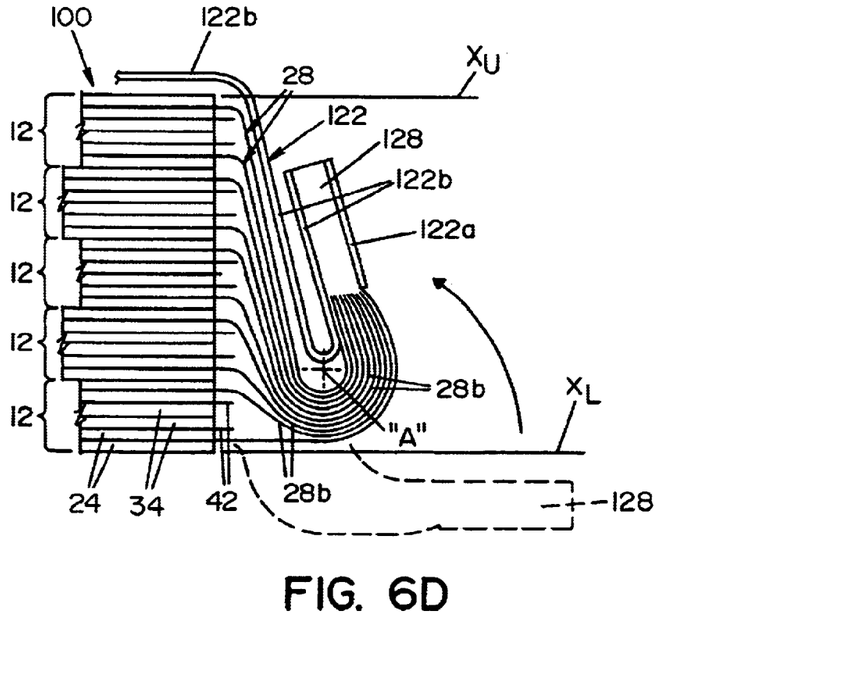

After trimming the end of cathode tab weldment 128, cathode tab weldment 128 and cathode current collector tabs 28 are wrapped around axis "A" to move cathode tab weldment 128 within the area or space defined by planar surfaces $X_L$ and $X_U$, and to position cathode tab weldment 128 adjacent to the end of multi-layer cell 100 with unjoined portions of current collector tabs 28 disposed therebetween. In this respect, the major axis of cathode tab weldment 128 is almost perpendicular to the planes defined by bi-cell layers 12. Welding free ends 28a together at a location offset from the cell body allows unattached intermediate portions 28b of cathode current collector tabs 28 to form a smooth, layered structure that when folded, i.e., bent, about axis "A," forms a tight packaged tab/lead assembly.

Figure 6E:
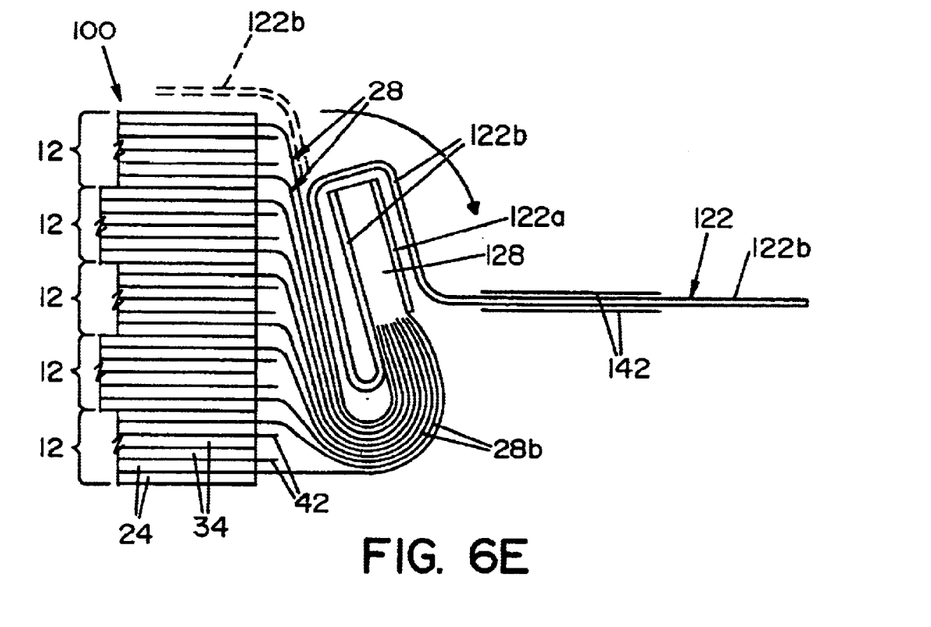

Moving cathode tab weldment 128 to the position as shown in FIG. 6D, basically replicates cathode lead portion 122b. In other words, part of cathode lead portion 122b is bent towards itself, forming a double layer. Cathode lead portion 122b is then wrapped over the end of cathode tab weldment 128, as best seen in FIG. 6E, to a position wherein the free end of cathode lead portion 122b projects generally parallel to the layers forming multi-cell 100.

Figure 6F:
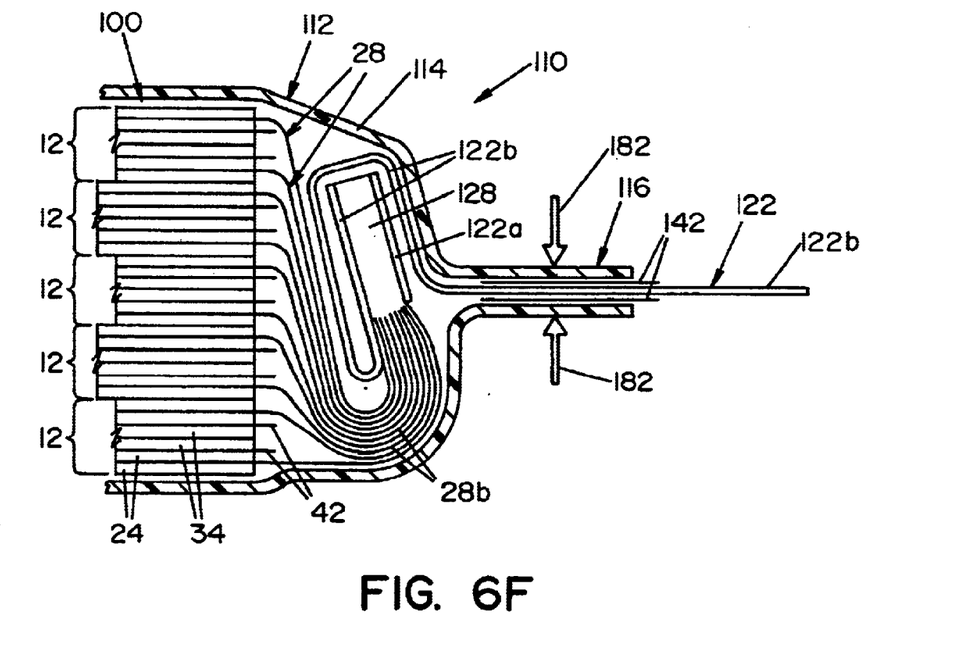

Adhesive bands or strips 142 may be applied to portions of cathode lead portion 122b, as heretofore described in U.S. Pat. No. 6,267,790 to Daroux et al. Multi-layer cell 100 is then packaged within flexible laminate 114 that is sealed around cathode lead portion 122b by the application of heat and pressure, as schematically illustrated in FIG. 6F, by arrows 182. In a similar fashion, anode current collector tabs 38 would be gathered together in stack 152 offset from the body of cell 100 and ultrasonically welded together, with anode lead 132, to form an anode weldment 138. Anode weldment 138 would be bent to a position similar to cathode weldment 128, and anode lead portion 132b would be wrapped over the end of anode weldment 138. Anode lead portion 132b would be sealed between layers of flexible laminate 114, as illustrated in FIG. 5. As will be appreciated by those skilled in the art, the sealing of laminate 114 around cathode lead portion 122 would occur simultaneously with the sealing of laminate 114 around anode lead portion 132b.

The present invention thus provides a method of joining current collector tabs in a multi-layer cell into a compact, reliable structure. The tight, compact structure facilitates more battery material within the space allotted in a given package. Moreover, in addition to the tight compactness of the connection, a structure according to the present invention provides a barrier or shield to reduce the likelihood of the weldment penetrating through outer packaging 112. In this respect, as shown in FIG. 6F, cathode lead portion 122b is wrapped over cathode tab weldment 128. In this respect, cathode lead portion 122b forms an intermediate, metal layer between cathode tab weldment 128 and laminate 114 forming packaging 112. Thus, in addition to being a cathodic lead, cathode lead portion 122b provides the added function of a barrier layer disposed between the corner and edges of cathode tab weldment 128 and flexible laminate 114 forming packaging 112.

Figure 7:
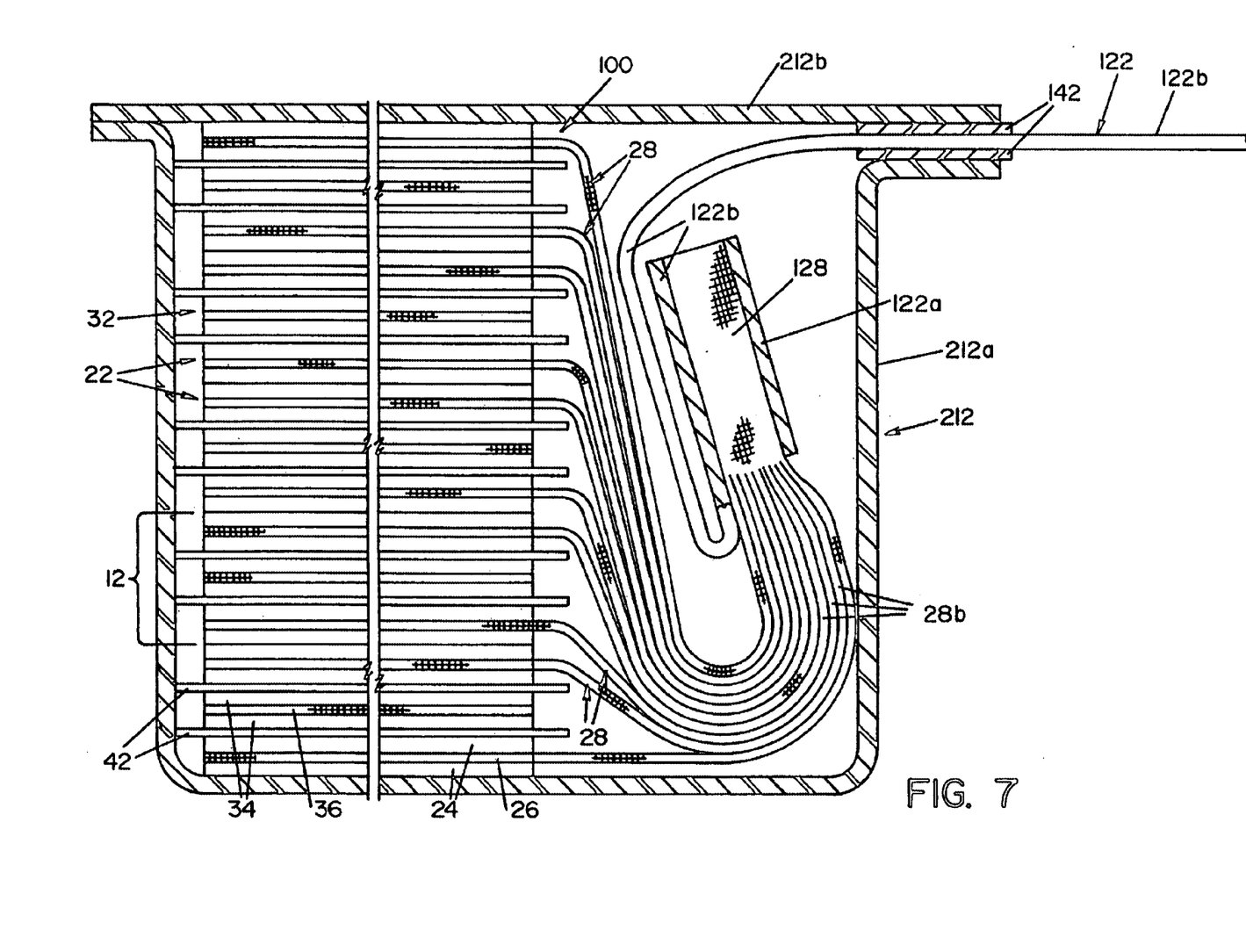
FIG. 7 is an enlarged, sectional view showing a multi-layer cell and current collector assembly according to the present invention used in a preformed, cup-shaped package.

The invention has heretofore been described with respect to packaging a multi-layer cell battery 100 within a flexible package 112. FIG. 7 illustrates how the same collector tab structure may be used in a rigid, "cup-shaped" package, designated 212. Package 212 includes a first cup-shaped portion, designated 212a, that is dimensioned to receive multi-layer cell 100. A generally planar lid or cover 212b is adapted to be sealed to cup-shaped portion 212a to form a fluid-tight packaging. Adhesive/sealant material 142 may be applied cathode lead portion 122b and anode lead portion 132b (not shown in FIG. 7) to facilitate the formation of the fluid-tight seal around such leads.

The foregoing describes specific embodiments of the present invention. It should be appreciated that this embodiment is described for purposes of illustration only, and that numerous alterations and modifications may be practiced by those skilled in the art without departing from the spirit and scope of the invention. For example, the formation of tab weldments 128, 138 may be accomplished by other than ultrasonic welding. In this respect, a laser beam or induction heating may also be used to weld the collector tabs. It is intended that all such modifications and alterations be included insofar as they come within the scope of the invention as claimed or the equivalents thereof.

What is claimed is:

1. A multi-cell Li-ion or Li-ion polymer battery formed in accordance with the following method:

a) stacking a plurality of cell sections, to form a cell body, each of said cell sections being essentially flat and having at least one flat, metallic current collector tab extending therefrom, said cell body having a planar upper surface and a planar lower surface with said current collector tabs extending from an end of said cell body in aligned, parallel relationship;

b) gathering said current collector tabs into a stack at a location offset from said cell body, said location being outside an area defined between said upper surface and said lower surface of said cell body;

c) compressing and welding ends of said tabs together at said location to form a tab weldment; and d) folding said tabs about an axis disposed within said area defined by said upper surface and said lower surface to position said tab weldment adjacent to said end of said cell body with said tabs and said tab weldment disposed within said area defined by said upper and lower planar surfaces.

2. A multi-cell Li-ion or Li-ion polymer battery as defined in claim 1, further comprising a lead comprised of a thin, metallic strip welded to said tab weldment, wherein two layers of said metallic strip are disposed between said tab weldment and said one side of said cell body when said tab weldment is folded into said generally U-shaped configuration.

3. A multi-cell Li-ion or Li-ion polymer battery as defined in claim 2, wherein said metallic strip is wrapped around said tab weldment.

4. A multi-cell Li-ion or Li-ion polymer battery as defined in claim 3, wherein said collector tabs are comprised of metallic mesh and said lead is a strip of solid metal having a width approximately equal to the width of said current collector tabs.

* * * * *